Jan. 12, 1965  M. BURNS ETAL  3,165,341
CLAMPING DEVICES FOR MATED FLANGES
Filed July 10, 1962  2 Sheets-Sheet 1

INVENTOR.
MARCY BURNS
NATHAN BURNS
BY
ATTORNEY

United States Patent Office 3,165,341
Patented Jan. 12, 1965

3,165,341
CLAMPING DEVICES FOR MATED FLANGES
Marcy Burns, New York, and Nathan Burns, Ardsley,
N.Y., assignors to Star Tank and Filter Corporation,
Bronx, N.Y., a corporation of New York
Filed July 10, 1962, Ser. No. 208,710
3 Claims. (Cl. 285—406)

This invention relates to flange clamping devices—more particularly to releasable means for securing together two coacting flanges that are components of a two-part piece of equipment such as a cylinder and head, a vessel and cover, two pipes etc.

The most common means for securing together such flanged members comprises a plurality of bolts extending through congruent holes in the mating flanges and held operatively in place by a plurality of nuts, or by stud bolts in threaded engagement with the internally threaded walls of similarly positioned holes. The use of such standard bolts has certain generally recognized disadvantages, such as the need to form said bolt-receiving holes, the necessity of increasing the thickness of the flanges to compensate for the weakened sections caused by the presence of said holes, the time lost in turning the bolts or nuts adequately to tighten the devices, the time-consuming operation of loosening said nuts and bolts and removing the bolts from the holes in order to effect a separation of the flanges, and the danger of misplacing the bolt elements when they are temporarily removed from the flanges.

In an attempt to provide flange-clamping means having none of these disadvantages, the conventional "swing bolt" was devised comprising a substantially U-shaped member having a shank with a holding arm at one end and a pivot arm at the other, a threaded member such as a bolt or nut in threaded engagement with said holding arm and adapted for releasable engagement with the adjacent flange, a pivot pin or bolt extending through a hole in said pivot arm, and an apertured anchor on or below the other flange pivotally supporting said pivot pin or bolt. When this device is in its operative position and said threaded member is tightened, it presses the adjacent flange towards the other coacting flange; and when it is desired to release this device, the threaded member is loosened and the device swung outwardly, the axis of rotation being parallel to the planes of said coacting flanges. While this swing bolt eliminates the use of holes in the flanges, and can be more readily fastened and released than the aforementioned standard bolt arrangement, it has certain serious shortcomings. In those designs of swing bolts having short holding and pivot arms, it is necessary to cut out circumferentially spaced recessed portions in the mating flanges to accommodate therein the shanks of the respective swing bolts when they are in clamping positions—a costly process. To avoid the necessity of providing such recesses, the said arms are elongated, so that the shanks are entirely beyond the lateral peripheries of the flanges—the pivots consisting of two spaced apertured walls flanking the pivot arm and supporting the pivot pin or bolt extending therethrough. With such a construction, the use of pivot bolts creates a crowded arrangement, since the heads and nuts of the pivot bolts are in close proximity to the heads and nuts of adjacent pivot bolts, making it difficult to assemble such units, or remove them when necessary. To overcome this difficulty, such swing bolts are often spaced farther apart, making it necessary to use heavier flanges and sturdier swing bolt components. Another inherent disadvantage of this form of clamping device is that the operative or engaging portion of the holding arm is disposed inwardly of the coacting pivotal axis, so as to enable said holding arm to be slightly elevated above and freed of the adjacent flange when the device is being swung into and out of its operative position. Since such an arrangement is one in which the operative engaging portion of the holding arm and the pivotal portion of the pivot arm are not in alignment, there is a moment arm present whereby, upon the application of tightening pressure, a bending stress is induced in the device, making it necessary to construct it of heavier stock. Moreover, in order to insure that the holding arm will not slip out of place due to the lateral force component resulting from the moment arm, it is necessary that the adjacent flange be provided with a ridge or recessed portion which, when engaged by the holding arm, will hold it against displacement. It is also to be noted that in the conventional swing bolt above described, the pivot pin or bolt coacts with the holding arm, so that the tightening force applied by the holding arm is taken up by the pivot pin or bolt, thereby making it necessary to make the latter elements sufficiently strong to resist shearing and bending stresses. Such swing bolts are thus comparatively expensive. Furthermore, because with these said devices relatively wide and heavy flanges are employed, the outward swing of these devices is often of such magnitude that they interfere with adjacent equipment.

It is accordingly our objective to provide an efficient clamping device of the above category having none of the aforesaid shortcomings, while possessing the advantageous features of both the standard bolt construction and the said swing bolt. In the accomplishment of this objective, we have conceived a swivel type of clamping device rotatable about an axis normal to the planes of the mating flanges and disposed outside of their respective peripheries, and having two holding arms in longitudinal alignment and adapted to engage the adjacent surfaces of the said flanges, there being no stress applied to the hinge support. The device thus possesses, in accordance with the objects of our invention, the following advantages over the known flange bolting and swing clamping devices: it can be applied and released more easily and with greater speed; it holds the mating flanges together more securely; it is not subject to moment arm stresses; it is lighter and less costly; it requires no flange holes or recesses; it requires narrower and thinner flanges; it requires smaller swing movements between clamping and full releasing positions; it can be used in more restricted working areas; it does not require removal from the flanges if the latter are to be separated; it can easily be removed and replaced, and without the use of special tools; it can be placed in comparatively close proximity to other similar units and yet be fully accessible for assembly, removing, tightening and releasing operations; it can be readily fabricated; and it is adaptable for use not only on horizontally disposed flanges, but on flanges in vertical and all other planes.

Other objects, features and advantages will appear from the drawings and the description hereinafter given.

Referring to the drawings.

Figure 3:
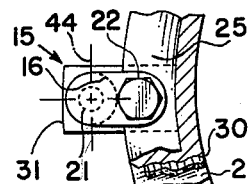
FIG. 3 is a plan view of FIG. 2, a fragment being broken away for clarity.
Figure 1:
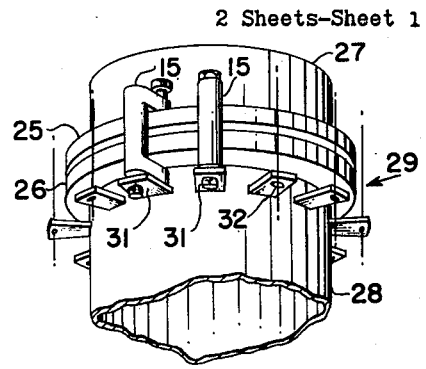
FIG. 1 is a fragmentary perspective view of two flanged members operatively held together by clamping devices according to one form of our invention, two of said devices being shown in place, the spacing of the others being indicated by dot-dash center lines.

In the form of our invention illustrated in FIGS. 1 to 5, the swivel clamp device 15 is of substantially U-shaped configuration comprising the shank 16, the holding arms 17 and 18 extending from the respective opposite ends 19 and 20 of said shank 16 and at right angles thereto, a pivot pin 21 shown as integral with the shank and extending from said end 20 in the longitudinal direction of said shank, and a bolt 22 the shank 23 of which is in threaded engagement with the internally threaded aperture 24 of said holding arm 17.

A plurality of said swivel clamps are positioned in spaced circumferential arrangement around the two mating flanges 25 and 26 affixed to the two coacting shell members 27 and 28, respectively, of the vessel generally referred to by the reference numeral 29, a gasket 30 being operatively positioned in place in known manner. Affixed to the shell member 28 and in spaced relation to the flange 26 is the pivot support bar 31 having the apertured portion 32 rotatably accommodating therein the said pin 21. It will be noted that said apertured portion 32 is disposed outwardly beyond the lateral peripheries 33 and 34 of said respective flanges 25 and 26; and it will be further observed that the space 35 between said flange 26 and said bar 31 is sufficient to freely accommodate therein said holding arm 18.

In the embodiment shown, the terminal portion of said pivot pin 21 is perforated and contains the cotter pin 36 to releasably hold the device 15 against detachment. The bolt 22 in threaded engagement with the said arm 17, hereinafter at times referred to as the "bolt arm," has its terminal flange-engaging portion 37 in longitudinal alignment with the flange-engaging protuberance 38 of the said arm 18, herein after at times referred to as the "coacting arm." It is preferred that the opposite outer surfaces 39 and 40 of the respective flanges 25 and 26 have the respective depressed portions 41 and 42 therein, to serve as seats for the said respective flange-engaging elements 37 and 38.

Figure 2:
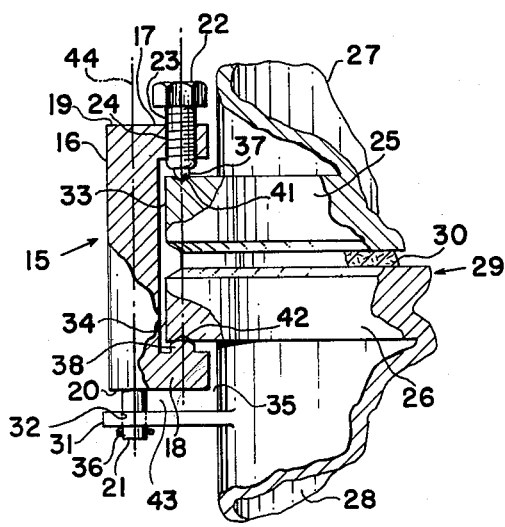
FIG. 2 is an enlarged part longitudinal section and part elevation of one of the clamping devices shown in FIG. 1, the device being in operative clamping position on the two mating flanges.

FIGURE 2 shows the device 15 in its operative pressing position. In this position the gasket 30 is tightly compressed between the flanges 25 and 26 under the coactive pressing action of the bolt arm 17 and coacting arm 18 through their respective flange-engaging components, to wit, the bolt 22 and the protuberance 38. Since the said bolt 22 and protuberance 38 are in longitudinal alignment, the tightening force applied to the bolt causes equal and opposite tightening forces, without any lateral components whatsoever. In the operative holding position, the arm 18 is—in the preferred proportions of our device—in spaced relation to the pivot bar 31, the space 43 facilitating the operative releasing action of said device, as will more clearly hereinafter appear. Inasmuch as the holding action is accomplished solely by the coactive pressure of the said arms 17 and 18, said pivot pin 21 is under no stress whatsoever. Hence said pin, as well as said shank 16, need be made only heavy enough to enable them to perform their respective functions, without any need to add material to provide for torsion or bending stresses as is required with the conventional swing bolts hereinabove referred to.

To release the device from its clamping position, the bolt 22 is loosened, and the entire device swung out about the axis of the pin 21, the particular form illustrated showing said axis 44 to be the longitudinal center line of said shank 16 and extending in a direction perpendicular to the planes of the mating flanges 25 and 26. The radius of the outward swing can be comparatively small, since the width of said flanges 25 and 26 can be narrow and the lengths of said arms 17 and 18 can be short, so that there is minimum danger of interfering with adjacent equipment. Because of the shortness of the operative swing of the arms 17 and 18 between their holding and releasing positions, the pivot bars 31 can be closely spaced, as indicated by the dot-dash positions of the device in FIG. 5. Hence, a relatively large number of such clamping devices can be employed around mating flanges, thereby to provide adequate holding force where that may be required under conditions of high separating pressures exerted against the secured-together members, such as the shells 27 and 28.

Figure 6:
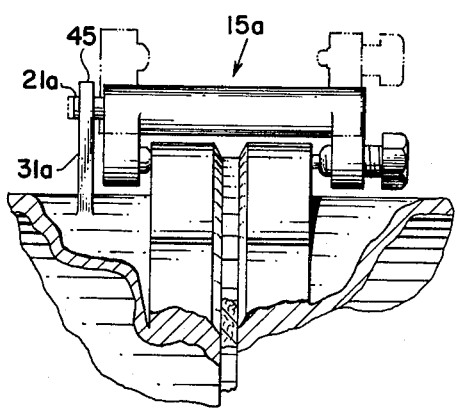
FIG. 6 is a fragmentary elevation, with parts broken away, of two flanged components with vertically disposed flanges, showing a modified form of our invention in clamping position, the dot-dash lines showing the device in fully retracted position.
Figure 7:
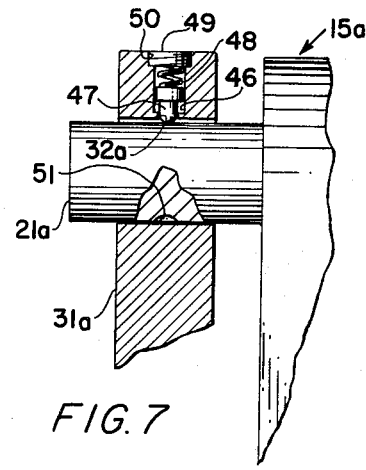
FIG. 7 is an enlarged part elevational, part sectional fragmentary view of the device of FIG. 6 shown in clamping position.
Figure 8:
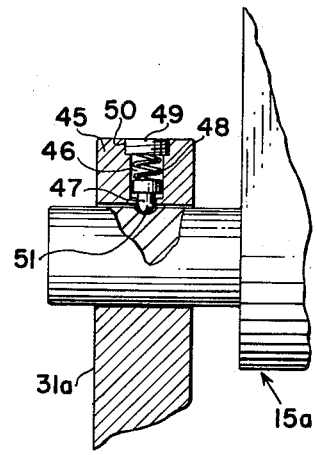
FIG. 8 is a view like FIG. 7 showing the device in its fully retracted position.

FIGURES 6 to 8 illustrate a form of our invention especially adapted for use with vertically disposed flanges, or flanges positioned in planes other than horizontal. The components of this form of swivel bolt 15a are essentially the same as the form above described, except that the pivot support bar 31a has at its terminal portion 45 a through channel 46 containing the pin 47 extending into the hole 32a, said pin 47 being urged rearwardly by the spring 48 maintained in compressed position by the cap 49 press-fitted into the enlarged recess 50. When the member 15a is operatively swung from its holding position 180° to its outermost position, as shown in FIG. 8, the pin 47, acting as a spring-loaded detent, will enter the cavity 51 in pin 21a, and yieldably hold the device against displacement by gravitational action.

Figure 9:
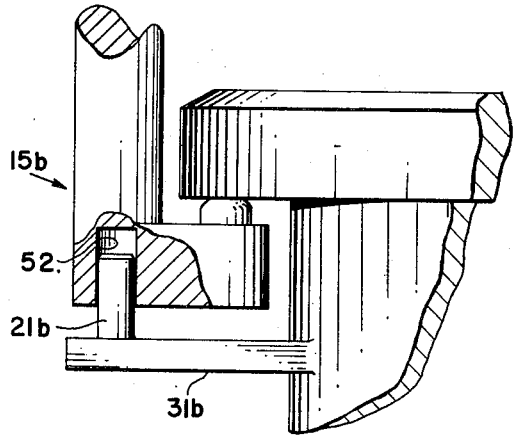
FIG. 9 is a fragmentary part elevational, part sectional view of another form of our invention illustrated in an operative clamping position.

In the embodiment shown in FIG. 9, the clamping device 15b is substantially similar to the forms above described, except that the pivotal means employed consists of a pivot pin 21b extending up from the support bar 31b, the member 15b having therein a recessed portion 52 into which said pivot pin 21b extends and with which it is rotatably engageable. The pivotal movement of the clamping device about the axis of the pin 21b is the same as in the other embodiments hereinabove described.

Figure 4:
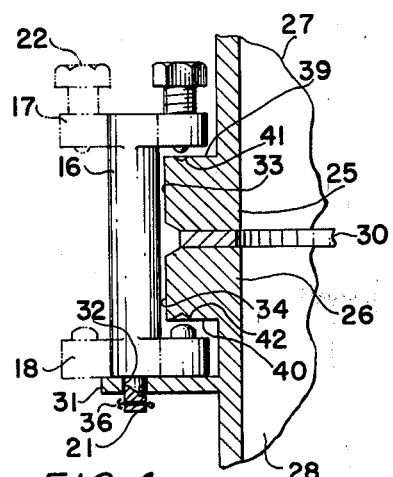
FIG. 4 is an elevational view of the clamping member of FIG. 2 but shown, in full lines, in released position, the dot-dash lines showing the device in its fully retracted position, the pivotal pin of the clamping member being shown partially in section.
Figure 5:
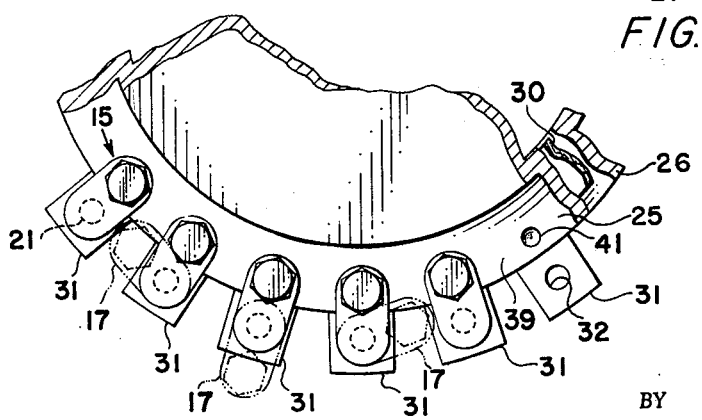
FIG. 5 is a fragmentary plan view of the components of FIG. 1, certain of the clamping devices being shown in their operative clamping positions, the dot-dash representations showing respective partly and fully retracted positions of said devices.

In any of the various embodiments of our invention, in the event it is desired to remove a unit from the supporting member, all that need be done is operatively to swing the device to a non-holding position, such as that shown in FIG. 4, and lift the unit out. In the form of FIG. 2, the cotter pin 36 must obviously first be removed. The replacement of the unit can be effected just as simply.

In the above description, the invention has been disclosed merely by way of example and in preferred manner; but obviously many variations and modifications may be made therein. It is to be understood, therefore, that the invention is not limited to any form or manner of practicing same, except insofar as such limitations are specified in the appended claims.

We claim:

1. In a clamping device for two parallel mating flanges one of which has a body portion, the combination of a pivot bar member carried by said body portion and extending outwardly therefrom, and a swivel clamp member pivotally connected to said pivot bar member; said clamp member having a shank positioned exteriorly of said flanges, two spaced holding arms connected to said shank, force-applying means on one of said arms for operative engagement with one of said flanges, and flange-engaging means on the other of said arms for operative engagement with the other of said flanges, said arms extending inwardly from said shank and being in flanking relation to said flanges when said clamp member is in operative clamping position, said pivot bar, said holding arms and said force-applying means being contained within the same plane; and coactive pivotal means on said pivot bar member and the adjacent end of said clamp member and having an axis extending longitudinally of said shank and disposed exteriorly of said flanges, said pivotal means comprising a pivot pin on one of said members and an apertured portion on the other of said members, said pin being in pivotal and slidable engagement with said apertured portion, said force-applying means and said pivotal means being on opposite sides of said mating flanges, said pin and apertured portion being so positioned and proportioned as to provide a clearance space between said pivot bar member and the said adjacent end of said clamp member when said clamp member is in operative clamping position, whereby said pivot bar member will be free to move in the direction of the extent of said axis toward said clamp member during the operative relative movements of said flanges upon an operative manipulation of said force-applying means.

2. In a clamping device, the combination according to claim 1, said pivot pin being connected to and extending from said clamp member, said apertured portion being in said pivot bar member, said pin extending into said apertured portion.

3. In a clamping device, the combination according to claim 1, said pivot pin being connected to and extending from said pivot bar member, said apertured portion being in said clamp member, said pin extending partially into said apertured portion when said clamp member is in its operative clamping position.

References Cited by the Examiner
UNITED STATES PATENTS

| | | | |
|---|---|---|---|
| 752,452 | 2/04 | Hohmann | 285—368 |
| 1,412,299 | 4/22 | Thumm | 292—256.71 |
| 1,941,294 | 12/33 | Eck et al. | 292—256.71 |
| 2,277,399 | 3/42 | Groff | 285—405 |
| 2,373,267 | 4/45 | Schultz | 269—249 |
| 2,441,754 | 5/48 | Cobi | 285—420 |
| 3,019,036 | 1/62 | Stranger | 285—18 |

FOREIGN PATENTS

| | | |
|---|---|---|
| 177,096 | 3/22 | Great Britain. |
| 606,842 | 8/48 | Great Britain. |

CARL W. TOMLIN, *Primary Examiner.*

THOMAS F. CALLAGHAN, *Examiner.*